: US 10,430,408 B2
(45) Date of Patent: Oct. 1, 2019

(12) United States Patent
Attaluri et al.

(54) TECHNOLOGY TO REDUCE COST OF CONCATENATION FOR HASH ARRAY (71) Applicant: International Business Machines Corporation, Armonk, NY (US)

(72) Inventors: Gopi K. Attaluri, San Jose, CA (US); Vijayshankar Raman, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1030 days.

(21) Appl. No.: 14/864,427

(22) Filed: Sep. 24, 2015

(65) Prior Publication Data
US 2017/0091271 A1    Mar. 30, 2017

(51) Int. Cl.
| G06F 17/00 | (2019.01) |
| G06F 17/30 | (2006.01) |
| G06F 16/2453 | (2019.01) |
| G06F 16/22 | (2019.01) |
| G06F 16/2455 | (2019.01) |

(52) U.S. Cl.
CPC .... G06F 16/24537 (2019.01); G06F 16/2255 (2019.01); G06F 16/2456 (2019.01)

(58) Field of Classification Search
CPC .................. G06F 17/30454; G06F 17/3033
USPC ....................................................... 707/714
See application file for complete search history.

(56) References Cited

U.S. PATENT DOCUMENTS

| 6,058,392 A * | 5/2000 | Sampson ............ G06F 16/2255 |
| 6,374,235 B1 | 4/2002 | Chen et al. |
| 7,958,114 B2 | 6/2011 | Chaudhuri et al. |
| 8,914,354 B2 | 12/2014 | Au et al. |
| 8,924,426 B2 | 12/2014 | Chattopadhyay et al. |
| 2008/0052270 A1* | 2/2008 | Karlsson ............ G06F 16/2255 |
| 2010/0106695 A1* | 4/2010 | Calder ................ G06F 16/2255 707/696 |
| 2012/0166419 A1* | 6/2012 | Enoki ................. G06F 16/9574 707/714 |
| 2013/0117255 A1 | 5/2013 | Liu et al. |
| 2014/0006380 A1 | 1/2014 | Arndt et al. |

(Continued)

OTHER PUBLICATIONS

Attaluri et al.; "DB2 With BLU Acceleration: So Much More Than Just a Column Store", Proceedings of the VLDB Endowment, vol. 6, No. 11, Aug. 26-30, 2013, pp. 1-18.

(Continued)

*Primary Examiner* — Tuan S Pham
*Assistant Examiner* — Thai V Dang
(74) *Attorney, Agent, or Firm* — Anthony V.S. England; Richard A. Wihelm (57) ABSTRACT

A first table has more than one key column, and a hash array is built for the table, which includes computing hash indices for respective rows of the first table based on more than one key column. Building the hash array also includes writing in the hash array for each row at a respective location in the hash array, wherein each location is indicated by each row's respective hash index computed from the more than one key column. The hash array is probed responsive to the second table. In the building of the hash array for the first table, the writing in the hash array for each row at a respective location in the hash array writes only one of the key columns as a single key field in the hash array for each row.

9 Claims, 3 Drawing Sheets

(56) References Cited

U.S. PATENT DOCUMENTS

| | | |
|---|---|---|
| 2014/0032569 A1 | 1/2014 | Kim et al. |
| 2014/0214796 A1 | 7/2014 | Barber et al. |
| 2014/0222752 A1 | 8/2014 | Isman et al. |
| 2014/0337314 A1 | 11/2014 | Potapov et al. |
| 2014/0372388 A1 | 12/2014 | Attaluri et al. |
| 2014/0372407 A1 | 12/2014 | Attaluri et al. |
| 2015/0339350 A1* | 11/2015 | Baggett ............... G06F 16/2282 707/714 |

OTHER PUBLICATIONS

Barber et al.; "Memory Efficient Hash Joins", Proceedings of the VLDB Endowment, vol. 8, No. 4, Dec. 2014, pp. 353-364.

Zhu et al.; "Efficient Star Join for Column-Oriented Data Store in the Map Reduce Environment", Web Information Systems and Applications (WISA), 20111 8th IEEE Conference on, Oct. 21-23, 2011, pp. 13-18.

* cited by examiner

TECHNOLOGY TO REDUCE COST OF CONCATENATION FOR HASH ARRAY

FIELD OF THE INVENTION

The field of the present invention concerns reducing cost of concatenation for a hash array, and, more particularly, providing a single key column for the hash array, whereas hash indices are based on more than one key column.

BACKGROUND

In the context of data tables, a query may specify criteria indicating values that may be in more than one of the tables. To produce the query result, a computer query process may perform a join operation to return rows from the tables, where query process selects the rows based on the values indicated by criteria of the query. A column to be matched in two tables for joining the tables may be referred to as a "join key column." More than one column may be matched for joining two tables, in which case the columns to be matched are all join key columns and those columns may be referred to collectively as the "join key.

The query process may use a hash table in performing a join operation, in which case the join operation is referred to as a "hash join." (To help avoid confusion between the tables joined in a join operation, on the one hand, and a hash table used to perform the join operation, on the other hand, the hash table will be referred to herein as a hash array.) For a hash join operation, the query process typically uses the smaller of two tables, which may be referred to as the "inner table," to build a hash array based on one or more key columns in the table. In general terms, when building a hash array a hash function computes a hash index that determines where to store each entry in the array based on the value of each entry itself. Thus, in building the hash array for a hash join, the join aspect of the query process computes the hash index for storing each row of the first table based on the one or more key column entries for the row.

Once the hash array is built (done during what may be referred to as hash array "build stage"), the join aspect of the process then scans the larger table, which may be referred to as the "outer table." The process then probes the hash array to find and fetch payload columns of rows that match key values of the join key column or columns (which may be referred to as hash array "probe" stage). To perform the probing, the join aspect of the process performs the same hash function computation to produce a hash index on each value scanned from the outer table and then determines whether there is an entry in hash array at the location indicated by the index. If there is an entry, this hit usually means the entry was stored there during the building of hash array. The entry is likely to match the value scanned from the outer table and used to generate the hash index for the probing, although the hit may be a false positive, since sometimes more than one value can produce the same hash index, (referred to as a hash "collision"). If the entry does match, the process fetches payload columns of the row associated with the matching entry in the hash array.

As can be understood from the above description, a join operation involves finding matching data and fetching data associated with the matching data. The hash array data structure is used for join operations because it tends to speed up the finding (i.e., looking up) and fetching of data. That is, by looking up elements in an array by index, the time to retrieve an entry from the hash array is independent of where the entry is stored therein.

SUMMARY

A method is provided for joining first and second data tables, according to embodiments of the present invention, wherein the first table has more than one key column. The method includes building a hash array for the first table, which includes computing, by a query process of a computer, hash indices for respective rows of the first table based on more than one key column. Building the hash array also includes writing in the hash array for each row at a respective location in the hash array, wherein each location is indicated by each row's respective hash index computed from the more than one key column. The method further includes probing the hash array by the query process responsive to the second table. In the building of the hash array for the first table, the writing in the hash array for each row at a respective location in the hash array writes only one of the key columns as a single key field in the hash array for each row.

Other embodiments of the invention are disclosed and claimed, including a computer system implementation and a computer program product.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

When there is more than one key column of an inner table, the key columns are conventionally concatenated for performing a join, in which case the join aspect of the process writes the concatenated values of key columns of one row in the inner table as a single column in a row of the hash array during the build stage, and also writes the rest of its inner table row to the same row of the hash array (or at least the rest of those columns of the row that are referenced in the query). Ordinarily, by concatenating the join key columns, this would avoid writing a separate field in each row of the hash array for each individual one of the more than one key column values of a single row in the inner table. Such concatenating would typically reduce the combined size of the key columns, because the space that would normally be used to pad the key column values to the nearest byte or word boundary in the hash array build stage would be expended only once for the concatenation, instead of once for each of the more than one key column values. In the hash array probe stage, such concatenating would ordinarily also result in more than one access to each row of the hash array for looking up the key of a single row of the outer table. Thus, it should be understood that conventional concatenating of join key columns very advantageously reduces the amount of memory that would otherwise be occupied in building the hash array and, perhaps even more importantly, reduces the number of accesses that would otherwise be required in the fetching from the hash array during the probe stage. Note also that when inner table key columns are concatenated before writing the inner table to the hash array when building the array for a join, corresponding outer table key columns are, likewise, concatenated before the probe stage scanning of the outer table for the join. All this concatenating takes additional resources and time.

Figure 1:
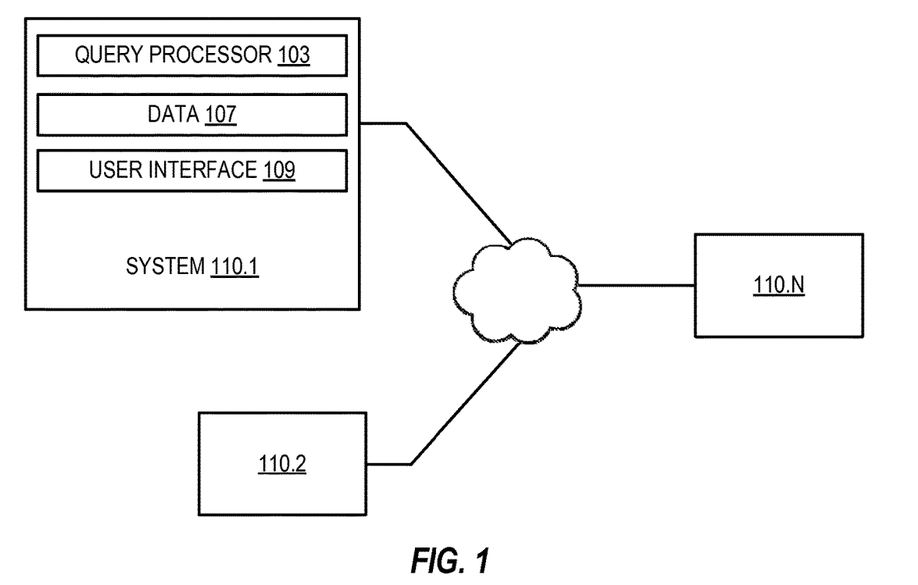
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N and connects via network 120, which may be public or private. Systems 110.1, 110.2, etc. include data and application modules, such as query processing application module 103, data 107, and user interface application module 109. (According to embodiments of the present invention, modules may be combined and may be part of the same application, of course.)

Figure 2:
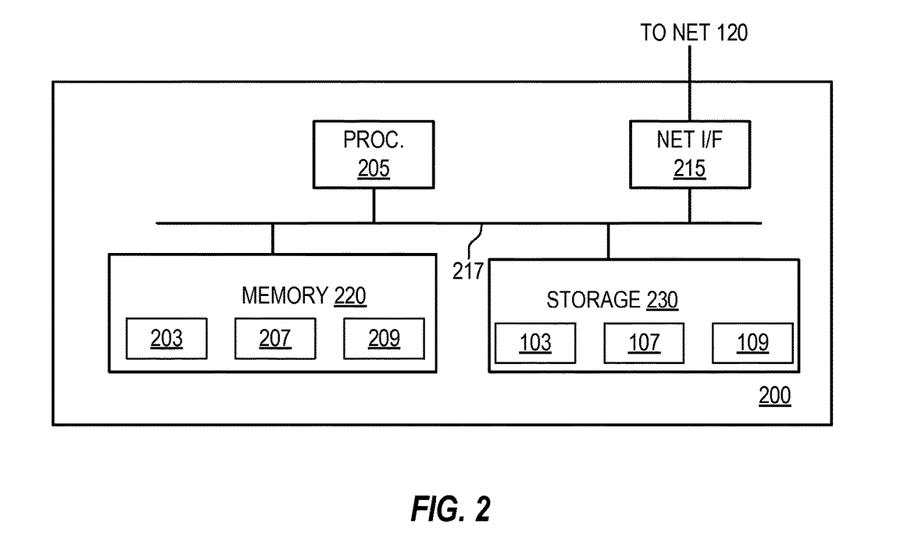
FIG. 2 is a block diagram of devices shown in FIG. 1, according to embodiments of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220 and storage device 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, according to embodiments of the present invention. Query processing module 103 provides a query process 203, user interface module 109 provides a user interface process 209 as run-time instances in memory 220 from storage 230. Likewise, data 107 may provide a run-time instance 207 in memory 220. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

An operating system runs on processing unit 205. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system, for example. Data processing system 200 may be a symmetric multiprocessor (SMP) system including a plurality of processors in processing unit 205. Alternatively, a single processor system may be employed.

In some embodiments, some or all mechanisms thereof may be implemented as application specific hardware, firmware, or the like. Likewise, mechanisms may be application software stored in a storage device and loaded into memory for execution by one or more hardware processors. As such, the computing device 200 shown in FIG. 2 becomes specifically configured to implement the mechanisms of the illustrative embodiments and specifically configured to perform operations described herein.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The above-described examples and depictions in the Figures are not meant to imply architectural limitations. Further, embodiments of the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

Figure 3:
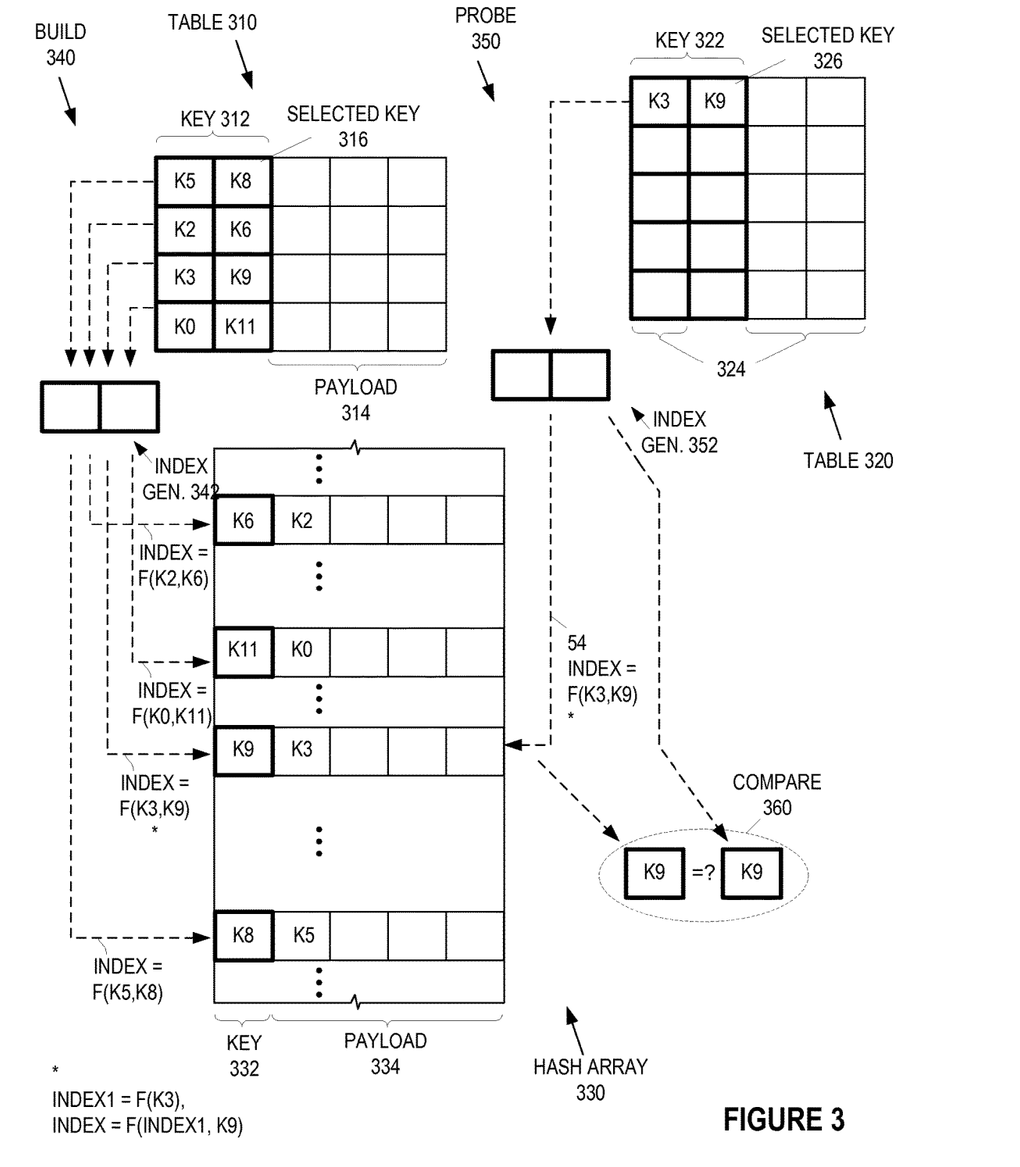
FIG. 3 illustrates aspects of building and probing the hash array and evaluating residual predicates, according to embodiments of the present invention.

According to embodiments of the present invention, as shown in FIG. 3, for example, when there is more than one key 312 column of inner table 310, the join aspect of query process 203 does NOT concatenate the key 312 columns for building hash array 330. However, in addition to query process 203 applying criteria of a query to tables 310 and 320 in a join operation, query process 203 may also apply additional query criteria to the results of the join. (This is referred to as applying "residual predicates." Residual predicates often arise due to inequalities in query criteria, but may arise in other circumstances.) The mere unqualified avoidance of concatenating, as described above, would shift some of query processing to processing of residual predicates. Consequently, it is not obvious that such avoidance would reduce overall query processing.

Further, it is not obvious that such unqualified avoidance would even reduce merely the join aspect of query processing, since the straightforward alternative to concatenating columns is, as previously stated herein above, to write a respective field in hash array 330 for each individual one of the more than one key 312 column values of a single row in the inner table 310. However, according to embodiments of the present invention, despite NOT concatenating the key 312 columns of inner table 310, query process 203 writes only one of the key 312 columns as a single key field 332 in hash array 330 for each row of inner table 310 during hash array 330 build 340 stage, as if inner table 310 had only a single join key 312 column, even though it has more than one. (This includes writing the remaining one or more key 312 columns of each corresponding inner table 310 row to the hash array 330 as payload fields 334, of course. Likewise, the process does NOT concatenate key 322 columns of outer table 320 for scanning outer table 320 and probing 350 hash array 330, according to embodiments of the present invention.) Query process 203 selects one of the key 312 columns as the single column 316 to use for the hash array 330 single key field 332, where the single, selected key 326 column is the one of the key 322 columns that filters outer table 320 the most, as described further herein below, after additional features are first described immediately below.

A join may typically contain equality and non-equality predicates, where equality predicates may be handled by the hash join (array) and the rest are handled as residual predicates (applied after the hash join is successfully applied). Conventionally, join key columns involved in equality predicates become fields in a hash array key, so that more key columns increase hash array lookup costs. By contrast, embodiments of the present invention store all but the most filtering join key column 316 with the rest of the payload fields 334 in hash array 330. Nevertheless, a hash index generating function 342 uses all the join key 312 columns to compute hash indices that determine storage locations in hash array 330. This reduces the cost of hash look up and does not necessarily cause excessive residual predicate logic operations, since residual predicates are not executed for every hash probe/look-up 350. They are avoided for probes that failed.

Although it saves computational resources for building hash array 330 to write only a single key 312 field in hash array 330 for each row of inner table 320, even though inner table 320 has more than one key 312 column and they are not concatenated, this single-field arrangement would not seem to be advantageous, since probing 350 hash array 330 with this arrangement would only take into account a single key 324 column, resulting in false hits on a scale that is likely to substantially degrade overall query performance. However, according to embodiments of the present invention, even though inner table 310 has more than one key 312 column and the join aspect of query process 203 writes only the selected one 316 of the key columns of one row in inner table 310 as a single key 332 field in a row of hash array 330 during the build 340 stage, i.e., does NOT write concatenated results of the key 312 columns, nevertheless, the join aspect of query process 203, when building 340 hash array 330, does compute each hash index based on all the key columns of the inner table (as shown), or at least more than one of them, and stores each single row of inner table 310 at only a single row of hash array 330, wherein each hash array 330 location is determined by each respective hash index computed from the at least more than one key 312 column. Likewise, when query process 203 probes 350 hash array 330, it also computes each hash index based on the same ones of the key 322 columns of outer table 320 and fetches each single row of inner table 310 from each corresponding single row of hash array 330, wherein each hash array 330 location is determined by each respective hash index computed from the more than one key 312 column.

Further, query process 203 computes each hash index using an incremental type of hash function generator 342 and 352, according to embodiments of the present invention, as shown. An incremental type of hash function generator computes a hash index for an input based on a current component of an input to the hash function and also based on a hash index computed earlier that input using one or more of the input's prior components. Specifically, for hash array 330 build 340 stage, hash index generator 342 of query process 203 computes a first hash index for a row of inner table 320 from a key value in that row in a first one of the key 312 columns of the inner table. In FIG. 3, this is illustrated with the row having key 312 column values K3 and K9, where the first hash index computed for the row is shown as INDEX1. Then hash index generator 342 incrementally computes a second hash index for the row by updating the first hash index for the row based on a key value in that row in the next one of the key 312 columns, and so on, if there are still more key columns, according to embodiments of the present invention, until query process 203 has incrementally updated the hash index to generate a final hash index for the row in this fashion using all the key columns of the row. In the example shown in FIG. 3, the second update of hash index INDEX1, which is the final index in this case, is shown as INDEX. At this point, query process 203 then stores the row of inner table 320 at the location in hash array 330 indicated by the final hash index (INDEX, in the example). It should be appreciated that this requires less computational resources than concatenating all the key 312 columns of inner table 310 and writing the concatenated results of each row in inner table 310 as a single column in a row of hash array 330 during the build 340 stage. And taking into account all the key column values in the hash index tends to address the false hit issue that would otherwise arise, as described herein above.

Likewise, for probing 350 hash array 330, query process 203 computes a first hash index for a row of outer table 320 from a key value in that row in first one of the key 322 columns of outer table 320, then incrementally computes a second hash index for the row by updating the first hash index for the row based on a key value in that row in the next one of the key 322 columns, and so on, if there are more key columns, until query process 203 has incrementally updated the hash index to generate a final hash index for the row in this fashion using all the key columns of the row, at which point query process 203 then probes the row of hash array 330 at the location indicated by the final hash index. It should be appreciated that this requires less computational resources than concatenating all the key 322 columns of outer table 320 before computing the hash index for each outer table 320 row during the probe 350 stage.

Once query process 203 computes a hash index for probing 350 in this fashion from join key 322 columns of a row in outer table 320, process 203 looks for a row at the location in hash array 330 indicated by the index. If such a row is found, then according to embodiments of the present invention, query process 203 compares 360 the key value for only selected key 326 column of the row in outer table 320 with the corresponding key 332 value stored in hash array 330 from the corresponding selected key 326 column of the row in inner table 310 as a step toward confirming that the found row actually does include key values matching of all the key 312 and 322 columns of both the inner table 310 and outer table 320. (According to embodiments of the present invention, none, or more than one of the key values may be compared.)

In an embodiment, for example, in which only one key value is compared to the corresponding value in hash array 330 after the hash index finds a hit, even if there is a match in this comparison, it is possible that the key 312 values of the found row of inner table 310 do not actually match of all the values of key 322 columns for the outer table 320. This possibility arises due to the possibility of a hash collision and due to the incompleteness of comparing less than all the join key 312 and 322 columns after a hit is indicated by the hash index. For this reason, it would seem to be disadvantageous to use only the one selected key 316 and 326 value for the post-hit comparison. However, according to embodiments of the present invention, the hash collision aspect of this seemingly disadvantageous arrangement is overcome, at least in part, by query process 203 building and probing a particular type of hash array, commonly referred to as a "compact hash table" (also referred to as a "concise hash table"), which tends to reduce collisions by using a large logical space for the hashed key values.

More specifically, a compact hash table includes an array having empty buckets removed. As implemented according to embodiments of the present invention, the array has only non-empty rows, where the rows include the single key field and payload fields, where the payload fields include contents of key column(s) not selected as the single key column. The compact hash table also includes an overflow hash table and a bitmap that accounts for both empty buckets and the non-empty buckets by indicating whether each bucket is empty.

According to embodiments of the present invention, the disadvantageous aspect introduced by the incompleteness of comparing less than all the join key columns after a hash array hit, is also overcome, at least in part, by query process 203 selecting a particular one 326 of the key 322 columns to use for the post-hit comparing. Specifically, query process 203 selects the key 326 column to use for the post-hit comparing 360 based on a determination of which of the key 322 columns of the outer table 320 are the most filtering. That is, query process 203 maintains and checks statistics on the number of distinct values of each of key 322 columns, and chooses, as selected key 326 column, the key 322 column with the largest number of distinct values, according to embodiments of the present invention. Or query process 203 maintains and checks other statistics on the frequency with which positive comparisons on a key 322 column are correlated with positive comparisons on all key 322 columns, and chooses, as selected key 326 column, the key 322 column with the highest correlation. In this way, query process 203 selects a key 326 column having a high probability of a positive comparison result for all the key 322 columns.

Regarding residual predicates evaluated by query process 203 after query process 203 fetches rows of inner table 310 payload fields 334 from hash array 330, which include fields for the one or more key 312 columns of inner table 310 not selected as the selected key 316 column, according to embodiments of the present invention query process 203 concatenates the set 324 of join columns of outer table 320, which includes the one or more key 312 columns of outer table 320 not selected as the selected key 326 column, and then concatenates the inner table payload fields 334, and then compares the two sets, because this tends to update a smaller amount of memory than comparing each individual join column of the outer table 324 with a hash array 330 field for each corresponding individual join column of inner table 310 one by one, since an aligning aspect of the concatenating tends to compress the columns.

The following additional example join illustrates the above:

Select first.i4 from outer, first
Where outer.o1=first.i1 and outer.o2=first.i2 and outer.o3=first.i3

Here, the join key columns are o1, o2 and o3 on the outer leg and i1, i2, i3 on the first leg. The original payload column is first.i4. For the example, assume that the most filtering join key column is i1 (which joins with o1). Therefore, process 203 of embodiments of the present invention builds a hash array, wherein all key columns of the inner table other than i1 are stored as payload fields therein. That is, i2, i3 become payload fields, even though they need to be joined with the corresponding join key columns on the outer leg. Process 203 computes hash keys based on all the join key columns (that is, i1, i2 and i3 for the first and o1, o2 and o3 for the outer leg), even though key columns i2 and i3 of the first are included as payload fields of hash array 330. For a row of the outer table's join key columns, process 203 computes a hash key based on all the join key columns and looks for a matching hash key among the hash keys for respective rows in hash array 330. If a match is found, then the hash look-up/probe has successfully found an inner table row in hash array 330 corresponding to the outer table row of the probe. At that point, process 203 executes residual predicates for the corresponding outer and first rows. The residual predicates represent i2=o2 and i3=o3, in this example. Process 203 executes these predicates separately if it does not concatenate i2 and i3. Process 203 executes them as a single equality if it does concatenate these columns.

Features disclosed herein above in the context of join operations for embodiments of the present invention may also be applied to groupby operations, wherein for probing a row in hash array 330, query process 203 first incrementally calculates the row's hash index by incrementally processing respective key 322 columns of the row, as described herein above. After incrementally computing the hash index (for a row of outer table 320), query process 203 checks to see if there is a row in hash array 330 at the location indicated by the hash index. Responsive to a match for the hash index in hash array 330, query process 203 fetches the row from hash array 330 that is indicated by the match. Although embodiments of the present invention are described herein above in which join key columns are not concatenated to verify a hit, for a groupby operation query process 203 does then concatenate hash array 330 row's groupby fields and the groupby columns of the outer table and verifies the hit by comparing the concatenated groupby columns of the outer table to the concatenated groupby columns that it fetched from hash array 330 for the indicated row. Responsive to no match for the hash index in hash array 330, the output is simply copied to the target bucket. In groupby, if a particular row is probed into hash array 330 and finds that the row with the verified hit is occupied, the groupby processing updates the payload in hash array 330 with a value from the input row. For example, the groupby might be to compute that sum of sales in each city, for each part. Here the columns to be concatenated are city and part. If for a given input row (containing a partial sale amount for one city for one part), for an occupied entry found in hash array 330, that occupied entry has the total sales for the city and part indicated by the input row, among the input rows seen so far. So this sum is added to the sale amount from this input row. On the other hand, if the row with groupby column values matching the input row is not found in hash array 330, a row is created in hash array 330 with these groupby column values (and 0 for the sum). In other words, the output is simply copied to the target bucket.

Figure 4:
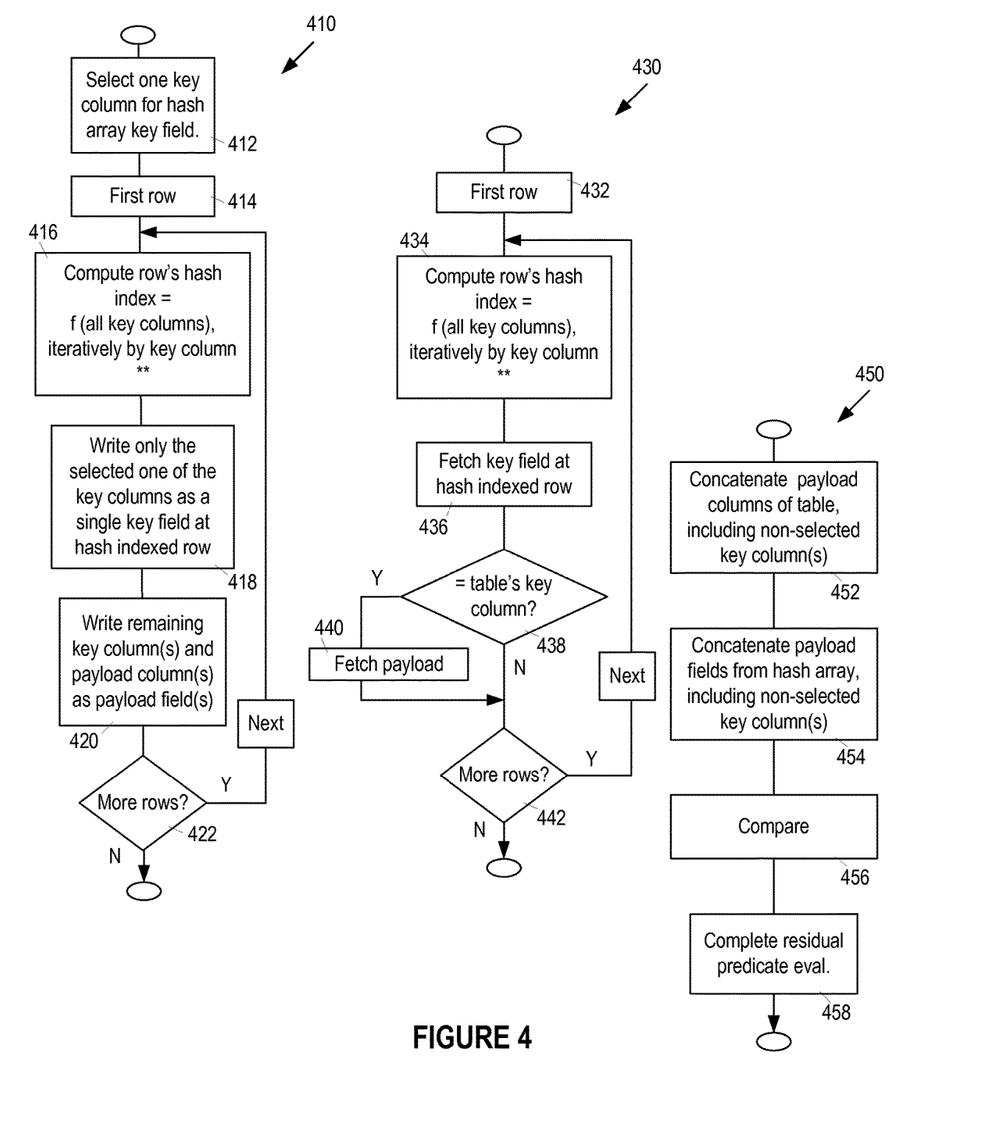
FIG. 4 illustrates, in flow charts, actions of building and probing the hash array and evaluating residual predicates, according to embodiments of the present invention.

Referring now to FIG. 4, actions described above are illustrated in flow charts, according to embodiments of the present invention. In building 410 a hash array for an inner table, a computer process selects 412 one of the key columns to use for hash array key field. The column that is selected is the one that corresponds to the most filtering one of the columns of the outer table. The first row of the inner table is processed 414, wherein the row's hash index is computed 416 as a function of all the key columns, which may be iteratively by key column as previously described, i.e., Hash Index n=f(keyn, f(keyn−1, f(keyn−2, . . . f(key0)))). The value of only the selected key column of the row is written 418 at the hash indexed row as a single key field. The remaining key column(s) and payload column(s) of the inner table are written 420 in the hash array as payload field(s). If another row is determined 422 to exist, then the actions repeat for the next row. Otherwise, probing actions 430 may be done.

For probing 430, the first row of outer table is processed 432, wherein the row's hash index is computed 434 as a function of all the key columns, again. This may, again, be computed iteratively by key column as previously described, i.e., Hash Index n=f(keyn, f(keyn−1, f(keyn−2, . . . f(key0)))). The value of the single key field at hash indexed row is fetched 436 and compared 438 to the value of corresponding, selected key column in the outer table. If they match, the payload fields are fetched 440, which includes key column(s) that were not selected 412 to be the single key field. If another row is determined 442 to exist in the outer table, the actions are repeated for the next row. Otherwise, residual predicate evaluation 450 may be done.

For residual predicate evaluation 450, payload columns of the outer table are concatenated 452, including non-selected key column(s), payload fields fetched from the hash array (for the inner table) are concatenated 454, which include non-selected key column(s), the concatenated columns are compare 456, and the evaluation completes based on the comparison, which varies according to the particular query.

It should be appreciated that a computer system configured for query processing as described herein above provides a specialized computing device specifically configured to implement the mechanisms of the illustrative embodiments and is not a general purpose computing device. Moreover, the implementation of the mechanisms of the illustrative embodiments, as described, improves the functionality of the computing device and provides a useful and concrete result that reduces the resource cost of query processing, including concatenation for hash arrays.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and application modules that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description, but is not intended to be exhaustive or limited to the invention in the form disclosed.

What is claimed is:

1. A method of joining first and second data tables, wherein the first and second tables each have more than one key column and at least one payload column, the method comprising:
    building a hash array for the first table, the hash array having payload fields and only a single key field, where building the hash array for the first table includes:
        computing, by a query process of a computer, hash indices for respective rows of the first table, where the hash index for each respective row of the first table is computed incrementally, one key column at a time, based on the more than one key column of the first table's respective row;
        selecting one of the key columns of the first table that is a most filtering column relative to the second table; and
        writing in the hash array, for each row of the first table at a respective location in the hash array, only the selected one of the key columns of the first table as the single key field and writing the at least one payload column of the first table and any other key column of the first table besides the selected one of the key columns of the first table as payload fields, wherein each location is indicated by each row's respective hash index computed from the more than one key column of the first table; and the method further comprises:
    probing the hash array by the query process responsive to the second table, including computing, by the query process, hash indices for respective rows of the second table, where the hash index computing for each respective row of the second table includes incrementally computing the hash index for the respective row of the second table one key column after another based on the more than one key column of the second table's respective row;
    fetching each respective row of the hash array that is at a location in the hash array indicated by a respective one of the hash indices for a respective row of the second table that is computed based on the more than one key column of the second table, where the fetching of each respective row of the hash array is further conditional upon the key field of the respective row of the hash array matching a corresponding one of the key columns of the respective row of the second table; and
    applying other query criteria to the payload fields of each respective fetched row to determine whether there is a match for the respective fetched row to the any other key column of the first table besides the selected one of the key columns of the first table.

2. The method of claim 1, wherein building the hash array for the first table includes building a compact hash table.

3. The method of claim 1, where applying other query criteria to the payload fields of each respective fetched row comprises:
    concatenating columns of the second table other than a column corresponding to the key field of the first table;
    concatenating fields fetched from the hash array for the first table other than the key field; and
    comparing the concatenated columns of the second table to the concatenated fields of the first table.

4. A system for joining first and second data tables, wherein the first and second tables each have more than one key column and at least one payload column, a processor; and
    computer readable storage media having instructions stored thereon for execution by the processor, wherein the instructions executed by the processor cause the processor to perform operations comprising:
        building a hash array for the first table, the hash array having payload fields and only a single key field, where building the hash array for the first table includes:
            computing, by a query process of a computer, hash indices for respective rows of the first table, where the hash index for each respective row of the first table is computed incrementally, one key column at a time, based on the more than one key column of the first table's respective row;
            selecting one of the key columns of the first table that is a most filtering column relative to the second table; and
            writing in the hash array, for each row of the first table at a respective location in the hash array, only the selected one of the key columns of the first table as the single key field and writing the at least one payload column of the first table and any other key column of the first table besides the selected one of the key columns of the first table as payload fields, wherein each location is indicated by each row's respective hash index computed from the more than one key column of the first table;
        and the operations further comprise:
            probing the hash array by the query process responsive to the second table, including computing, by the query process, hash indices for respective rows of the second table, where the hash index computing for each respective row of the second table includes incrementally computing the hash index for the respective row of the second table one key column after another based on the more than one key column of the second table's respective row;

fetching each respective row of the hash array that is at a location in the hash array indicated by a respective one of the hash indices for a respective row of the second table that is computed based on the more than one key column of the second table, where the fetching of each respective row of the hash array is further conditional upon the key field of the respective row of the hash array matching a corresponding one of the key columns of the respective row of the second table; and applying other query criteria to the payload fields of each respective fetched row to determine whether there is a match for the respective fetched row to the any other key column of the first table besides the selected one of the key columns of the first table.

5. The system of claim 4, wherein building the hash array for the first table includes building a compact hash table.

6. The system of claim 4, wherein applying other query criteria to the payload fields of each respective fetched row comprises:

concatenating columns of the second table other than a column corresponding to the key field of the first table;

concatenating fields fetched from the hash array for the first table other than the key field; and comparing the concatenated columns of the second table to the concatenated fields of the first table.

7. A computer program product for joining first and second data tables, wherein the first and second tables each have more than one key column and at least one payload column, including a computer readable storage medium having instructions stored thereon for execution by a computer, wherein the instructions, when executed by the computer, cause the computer to perform operations comprising:

building a hash array for the first table, the hash array having payload fields and only a single key field, where building the hash array for the first table includes:

computing, by a query process of a computer, hash indices for respective rows of the first table, where the hash index for each respective row of the first table is computed incrementally, one key column at a time, based on the more than one key column of the first table's respective row;

selecting one of the key columns of the first table that is a most filtering column relative to the second table; and writing in the hash array, for each row of the first table at a respective location in the hash array, only the selected one of the key columns of the first table as the single key field and writing the at least one payload column of the first table and any other key column of the first table besides the selected one of the key columns of the first table as payload fields, wherein each location is indicated by each row's respective hash index computed from the more than one key column of the first table;

and the operations further comprise:

probing the hash array by the query process responsive to the second table, including computing, by the query process, hash indices for respective rows of the second table, where the hash index computing for each respective row of the second table includes incrementally computing the hash index for the respective row of the second table one key column after another based on the more than one key column of the second table's respective row;

fetching each respective row of the hash array that is at a location in the hash array indicated by a respective one of the hash indices for a respective row of the second table that is computed based on the more than one key column of the second table, where the fetching of each respective row of the hash array is further conditional upon the key field of the respective row of the hash array matching a corresponding one of the key columns of the respective row of the second table; and applying other query criteria to the payload fields of each respective fetched row to determine whether there is a match for the respective fetched row to the any other key column of the first table besides the selected one of the key columns of the first table.

8. The computer program product of claim 7, wherein building the hash array for the first table includes building a compact hash table.

9. The computer program product of claim 7, wherein applying other query criteria to the payload fields of each respective fetched row comprises:

concatenating columns of the second table other than a column corresponding to the key field of the first table;

concatenating fields fetched from the hash array for the first table other than the key field; and comparing the concatenated columns of the second table to the concatenated fields of the first table.

* * * * *